Feb. 18, 1969    W. J. DIVINE ET AL    3,428,378

MINIATURE BALL BEARING

Filed Nov. 2, 1966

WILLIAM J. DIVINE
RICHARD G. P. HOOD
INVENTORS

BY *Lyon & Lyon*

ATTORNEYS

United States Patent Office 3,428,378
Patented Feb. 18, 1969

3,428,378
MINIATURE BALL BEARING
William J. Divine, Altadena, and Richard G. P. Hood, Pasadena, Calif., assignors to Di Mico Corp. Ltd., Hollywood, Calif., a corporation of California
Filed Nov. 2, 1966, Ser. No. 591,527
U.S. Cl. 308—193    3 Claims
Int. Cl. F16c *33/00;* B21d *53/10*

ABSTRACT OF THE DISCLOSURE

A ball bearing intended primarily for manufacture in miniature size in which a grooved cylindrical inner race is surrounded with an outer race having a relatively massive bore and deformable lip which, initially, provides with the inner race, an annular groove to receive a full complement of bearing balls and which is deformable to form with the groove and the base, three essentially point contacts with each ball.

---

This invention relates to miniature ball bearings and method of manufacture, and included in the objects of this invention are:

First, to provide a miniature ball bearing and method of manufacture; for example, ball bearings having an outside diameter in the order of $3/16''$, wherein the manufacturing cost is materially below that which has heretofore been possible.

Second, to provide a miniature ball bearing which does not require as rigid tolerance requirements in the parts receiving the bearing as has been previously required.

Third, to provide a miniature ball bearing of the full complement type without spacers and without notches for insertion of bearing balls so that the bearing has superior load carrying capabilities, both radially and axially.

Fourth, to provide a miniature ball bearing which incorporates a novel outer ring especially adapted to withstand excessive loads, which may occur during manufacturing and installation.

Fifth, to provide a miniature ball bearing and method of manufacture wherein the highly desirable "Gothic" or three point bearing contact is attained.

With the above and other object in view, as may appear hereinafter, reference is directed to the accompanying drawings in which.

The miniature ball bearing includes an inner bearing ring 1 which is cylindrical except for an annular raceway 2 in its outer periphery.

Figure 2:
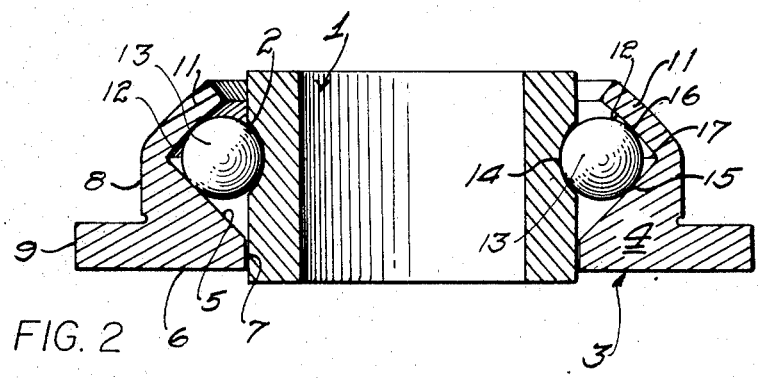
FIGURE 2 is a similar enlarged transverse sectional view showing the completed miniature ball bearing.
Figure 3:
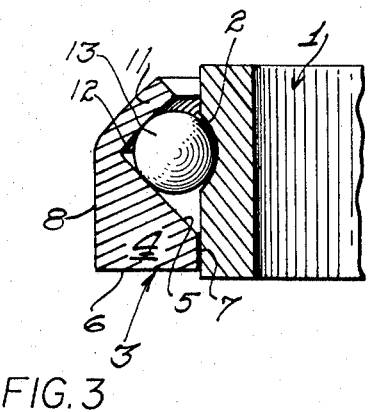
FIGURE 3 is an enlarged fragmentary sectional view showing a modified form of the miniature ball bearing.

The miniature ball bearing also includes an outer bearing ring 3 which includes a relatively massive annular body 4 of essentially triangular cross section. The body includes a conical bearing wall or land 5, a planar end wall 6. The bearing wall converges inwardly, and the inner extremities of the walls 5 and 6 are separated by a cylindrical inner wall 7. The surface of the body 4 is completed by a cylindrical outer wall 8. The outer wall 8 may be provided with a radially outwardly directed end flange 9, as shown in FIGURES 1 and 2, or the end flange may be omitted, as indicated in FIGURE 3.

Figure 1:
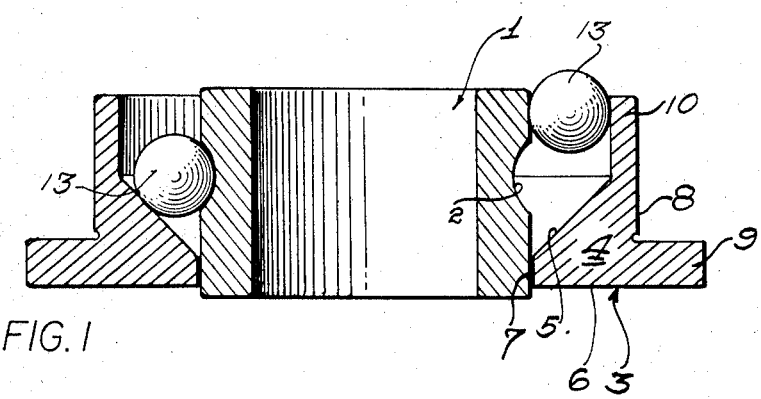
FIGURE 1 is a greatly enlarged transverse sectional view of the miniature ball bearing in the process of assembly.

Extending axially from the radially outer periphery of the conical bearing wall 5, and having an outer surface flush with the outer wall 8, is an axially directed lip 10, indicated in FIGURE 1. The lip 10 is deformable to form an essentially conical lip 11, as shown in FIGURES 2 and 3, forming an essentially conical bearing wall or land 12, confronting the bearing wall 5.

A set of bearing balls 13 are received in the annular space defined by the raceway 2 and the bearing walls 5 and 12.

Initially, the distance between the inner surface of the axially directed lip 10 and the outer surface or land of the inner bearing 1 is equal to the diameter of the bearing balls 13, so that the set of bearing balls may be dropped into the annular space and be deflected by the bearing wall 5 into the raceway 2, as suggested in FIGURE 1. After the set of bearing balls have been received, the lip 10 is deformed, producing the conical lip 11.

The radius of the raceway is slightly greater than the radius of the bearing ball 13, so that each bearing ball is in point bearing contact with the raceway, as indicated by 14. Similarly, each bearing ball is in point contact with the bearing wall 5, as indicated by 15, and in point contact with the bearing wall 12, as indicated by 16. The apex, designated 17, of the channel formed between the confronting bearing walls 5 and 12, is spaced from the bearing wall a distance corresponding to the depth of the raceway 2. The channel thus formed in the region of the apex 17 provides an effective lubricant reservoir.

In the manufacture of larger ball bearings, it has been found desirable to provide a three point contact with the bearing balls. This has been referred to bearing manufacture as a "Gothic Arch." However, this desirable configuration has not been previously attained in the construction of miniature ball bearings. In this regard, a typical miniature ball bearing may have an outside diameter of $3/16''$, and an inside diameter of $5/64''$, and may be much smaller or larger, as desired.

It will be noted that a full complement of balls may be placed between the bearing rings. No spacer ring is required between the balls, and more particularly, no notching of the inner raceway or other surface leading to the space occupied by the set of balls is needed in order to place a full compliment of balls between the bearing rings.

It will also be noted that the inner wall 7 of the outer ring may terminate in close proximity to the outer surface of the inner bearing ring, and that the axial extent of the inner wall 7 may be such as to form an effective dirt shield.

Also it should be noted that as compared to the lip 11, and to the inner bearing ring 1, the body 4 of the outer bearing ring is quite massive. Also, the radial depth is comparatively great. This is of utmost importance. Heretofor, the use of miniature ball bearings has been confined, almost exclusively, to highly precision and expensive apparatus, in which all parts of the apparatus were manufactured to very close tolerances. As a result, the precise fit between the miniature bearing and the structure in which it was fitted could be maintained, at of course, considerable expense. By reason of the relatively massive construction of the body portion 4, such a close tolerance between the miniature bearing and the member in which it is fitted need not be maintained. Thus, by providing the relatively massive body, the miniature ball bearing may be fitted into die cast parts or injection molded parts without precision finishing of the receiving cavity. By way of example, a conventional miniature bearing cannot be pressed into a housing with more than .0004" interference, and then only if the housing is truly round, within say ±.0001". In practice, it is not uncommon to limit the interference fit to .0002".

With regard to the bearing herein described, an interference fit in the range between .0005" and .001" has been found to be feasible.

It will be noted further that the radially inward pressure applied by an interference fit is carried entirely by the body 4 and not by the deflected lip 11.

It has been found because of the relatively large mass of the body 4, that the outer race may be formed of slightly softer material than might otherwise be selected, and that the lip on being deflected is workhardened to withstand bearing loads which might otherwise cause it to retreat from its initially deformed position.

It will be observed that due to the fact that a full complement of bearing balls, free of any spacer, may be inserted, without the need of notching the raceway, and further by reason of the three point contact between each ball and the bearing lands and raceway, the bearing has a high load capacity.

It will also be observed, that by provision of the lip 10 which initially extends axially and is spaced from the inner ring 1 a distance to compensate for the depth of the raceway 2, the bearing balls may be inserted simultaneously so as to simplify greatly the assembly of the bearing.

We claim:
1. A miniature ball bearing, comprising:
   (a) a cylindrical inner bearing ring having an inner raceway;
   (b) an outer bearing ring including a conical bearing wall, a planar end wall, said walls converging radially inwardly, a radially inner wall contiguous to said inner bearing ring and joining said conical and planar walls, an outer cylindrical wall extending from said planar wall, and an essentially conical inwardly directed lip continuing from said outer cylindrical wall and said conical wall, said lip having an essentially conical surface confronting said conical wall;
   (c) and a set of bearing balls in point contact with said conical wall, said conical surface and said inner raceway;
   (d) said conical, planar, and cylindrical walls defining a ring of essentially triangular cross section.

2. a miniature ball bearing, as defined in claim 1, wherein:
   (a) said outer bearing ring is provided with a radially outwardly extending flange coplanar with said end wall.

3. A miniature ball bearing, as defined in claim 1, wherein:
   (a) said lip initially extends axially to define with the inner bearing ring, an annular space dimensioned to receive said set of bearing balls, and is constrictable over said balls to retain said balls on said inner raceway.

References Cited
UNITED STATES PATENTS

| | | | |
|---|---|---|---|
| 998,099 | 7/1911 | Knipe | 308—195 |
| 3,171,697 | 3/1965 | Nicolaides | 308—195 X |
| 3,290,100 | 12/1966 | Leciejewski | 308—193 X |

CARROLL B. DORITY, Jr., *Primary Examiner.*

U.S. Cl. X.R.

29—149.5